US010393066B2

(12) United States Patent
Wawrzynek et al.

(10) Patent No.: US 10,393,066 B2
(45) Date of Patent: Aug. 27, 2019

(54) AIRCRAFT THRUST REVERSER WITH OUT-OF-PLANE ASSISTING ACTUATOR

(71) Applicant: HONEYWELL INTERNATIONAL INC., Morris Plains, NJ (US)

(72) Inventors: James Wawrzynek, Phoenix, AZ (US); Steve Abel, Chandler, AZ (US); Kevin K Chakkera, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 379 days.

(21) Appl. No.: 15/424,264

(22) Filed: Feb. 3, 2017

(65) Prior Publication Data

US 2018/0038313 A1 Feb. 8, 2018

Related U.S. Application Data

(60) Provisional application No. 62/372,037, filed on Aug. 8, 2016.

(51) Int. Cl.
*F02K 1/76* (2006.01)
*F02K 1/72* (2006.01)

(52) U.S. Cl.
CPC ................ *F02K 1/763* (2013.01); *F02K 1/72* (2013.01); *F05D 2220/323* (2013.01)

(58) Field of Classification Search
CPC ... F02K 1/763; F02K 1/72; F02K 1/62; F02K 1/625
See application file for complete search history.

(56) References Cited

U.S. PATENT DOCUMENTS

| | | | | |
|---|---|---|---|---|
| 3,829,020 A * | 8/1974 | Stearns | F02K 1/09 181/216 |
| 7,124,981 B2 * | 10/2006 | Parham | F02K 1/62 244/110 B |
| 9,322,360 B2 * | 4/2016 | James | F02K 1/62 |
| 2014/0027537 A1 * | 1/2014 | Binks | F02K 1/09 239/265.35 |

* cited by examiner

*Primary Examiner* — Andrew H Nguyen
(74) *Attorney, Agent, or Firm* — Lorenz & Kopf, LLP

(57) ABSTRACT

A thrust reverser system for a gas turbine engine includes a support structure, a transcowl, a door, a main actuator, and an assist actuator. The transcowl is mounted on the support structure and is axially translatable between a stowed position and a deployed position. The door is pivotally coupled to the support structure and is rotatable between at least a first position and a second position when the transcowl translates between the stowed position and the deployed position, respectively. The main actuator is configured to supply an actuation force to the transcowl to thereby move the transcowl between the stowed and deployed positions. The assist actuator is coupled to the door, and is configured to supply an actuation assist force to the door and, upon rotation of the door to an intermediate position between the first position and the second position, to commence load sharing with the main actuator.

20 Claims, 5 Drawing Sheets

AIRCRAFT THRUST REVERSER WITH OUT-OF-PLANE ASSISTING ACTUATOR

CROSS-REFERENCE TO RELATED APPLICATION

This application claims the benefit of U.S. Provisional Application No. 62/372,037, filed Aug. 8, 2016.

TECHNICAL FIELD

The present invention generally relates to aircraft thrust reversers, and more particularly relates to an aircraft thrust reverser with one or more out-of-plane assisting actuators.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the bypass airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan bypass airflow through a plurality of cascade vanes disposed within an aperture of a reverse flow path. Typically, fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers typically include so-called "Target-type," "Bucket-type," and "Clamshell Door-type" thrust reversers. These types of thrust reversers typically use two or more pivoting doors that rotate, simultaneously opening a reverse flow path through an aperture and blocking the forward thrust flow path. However, a transcowl type thrust reverser could also be configured for use in a mixed flow application. Regardless of type, mixed flow thrust reversers are necessarily located aft or downstream of the engine fan and core, and often form the aft part of the engine nacelle.

Transcowl type thrust reversers transition from the forward thrust state to the reverse thrust state by translating the transcowl aft so as to open a reverse thrust aperture, and simultaneously rotating a set of doors so as to obstruct the forward thrust nozzle. This coordinated motion between the transcowl and the doors is typically achieved by the use of a linkage rod arrangement, which connects the doors to the transcowl so that translational motion of the transcowl causes rotational motion of the doors.

It is not uncommon that the conventional actuator and linkage arrangement will have a less than optimal mechanical advantage in reacting against blocker door aerodynamic loads. In some cases, the aiding, or overhauling loads (braking), during extend (deploy) operation are much greater than the resisting loads (motoring). This occurs a small fraction of the time, such as for a rejected takeoff (RTO) scenario. In addition, the static loads incurred at the deploy stop when the engine powers up can be even greater. This burden drives the power demand and structural design requirements. In some cases, the system could be three or even four times heavier compared to one designed only for the resisting loads.

Hence there is a need for a configuration that will provide a more optimal mechanical advantage and that, preferably, is independently controllable to share the operational loads and static full deploy loads. Such a configuration could reduce the size and power requirements of known thrust reverser systems.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust reverser system for a gas turbine engine includes a support structure, a transcowl, a door, a main actuator, and an assist actuator. The support structure is configured to be mounted to the turbine engine. The transcowl is mounted on the support structure and is axially translatable, relative to the support structure, between a stowed position and a deployed position. The door is pivotally coupled to the support structure and is rotatable between at least a first position and a second position when the transcowl translates between the stowed position and the deployed position, respectively. The door is configured, when it is in the second position, to redirect engine airflow to thereby generate reverse thrust. The main actuator is configured to supply an actuation force to the transcowl to thereby move the transcowl between the stowed and deployed positions. The assist actuator is coupled to the door, and is configured to supply an actuation assist force to the door and, upon rotation of the door to an intermediate position between the first position and the second position, to commence load sharing with the main actuator.

In another embodiment, a thrust reverser system for a gas turbine engine includes a support structure, a transcowl, a door, a main actuator, an assist actuator, and a control. The support structure is configured to be mounted to the turbine engine. The transcowl is mounted on the support structure and is axially translatable, relative to the support structure, between a stowed position and a deployed position. The door is pivotally coupled to the support structure and is rotatable between at least a first position and a second position when the transcowl translates between the stowed position, and the deployed position, respectively. The door is configured, when it is in the second position, to redirect engine airflow to thereby generate reverse thrust. The main actuator is configured, upon being electrically energized, to supply an actuation force to the transcowl to thereby move the transcowl between the stowed and deployed positions. The assist actuator is coupled to the door and is configured, upon being electrically energized, to supply an actuation assist force to the door, to thereby reduce loading on the main actuator. The control is coupled to the main actuator and the assist actuator. The control is configured to: (i) energize the main actuator throughout transcowl movement between the stowed and deployed positions, and (ii) energize the assist actuator at least when the door is rotated to a predetermined intermediate position between the first position and the second position.

In yet another embodiment, a thrust reverser system for a gas turbine engine includes a support structure, a plurality of transcowls, a plurality of doors, a plurality of main actuators, and a plurality of assist actuators. The support structure is configured to be mounted to the turbine engine. Each transcowl is axially translatable, relative to the support structure, between a stowed position and a deployed position. Each door is pivotally coupled to the support structure, and each is rotatable between at least a first position and a second position when the transcowls translate between the stowed position and the deployed position, respectively. Each door is configured, when it is in the second position, to redirect engine airflow to thereby generate reverse thrust. Each main actuator is configured to supply an actuation force to one of the transcowls to thereby move the transcowls between the stowed and deployed positions. Each assist actuator is coupled to one of the doors, and each is configured to supply an actuation assist force to one of the doors and, upon rotation of the doors to an intermediate position between the first position and the second position, to commence load sharing with the main actuators.

Furthermore, other desirable features and characteristics of the aircraft thrust reverser system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
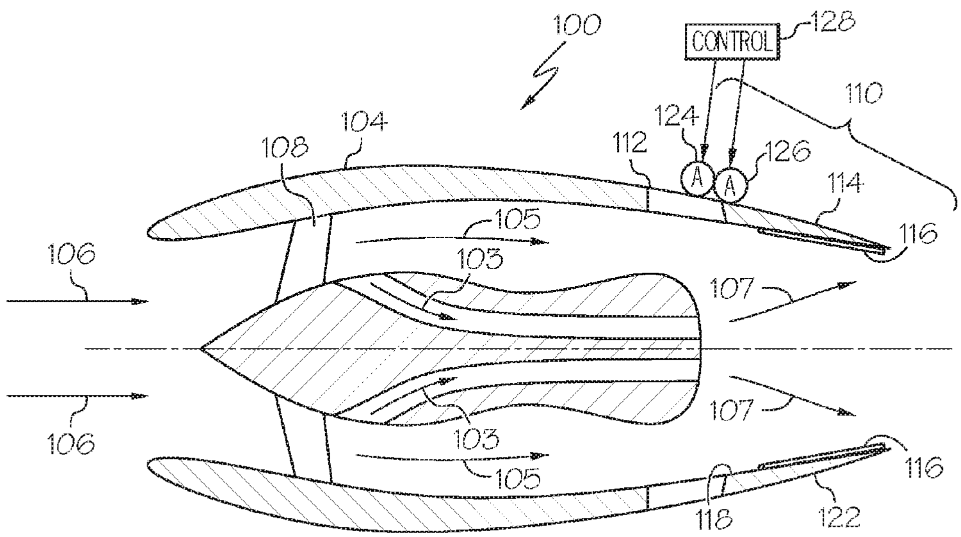
FIGS. 1 and 2 depict a turbofan engine equipped with a mixed flow thrust reverser system, and with the thrust reverser system in a stowed position and deployed position, respectively.
Figure 2:
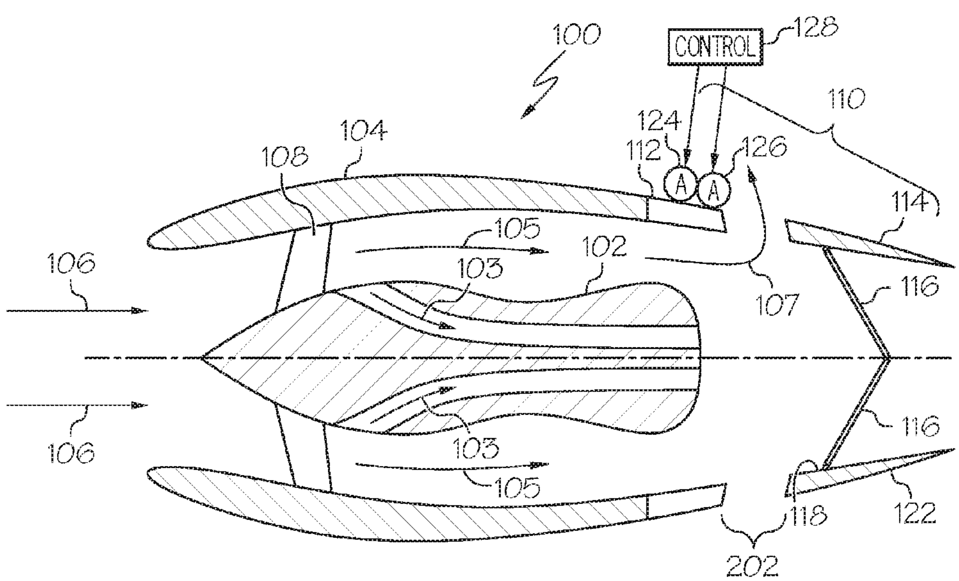
Figure 3:
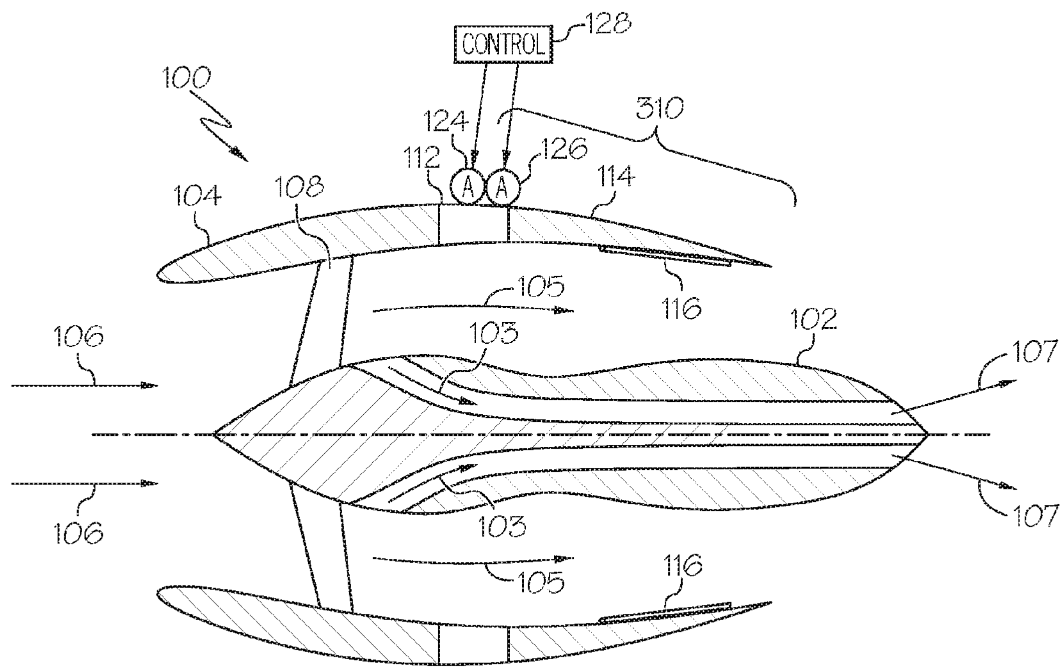
FIGS. 3 and 4 depict a turbofan engine equipped with a fan flow thrust reverser system, and with the thrust reverser system in a stowed position and deployed position, respectively.
Figure 4:
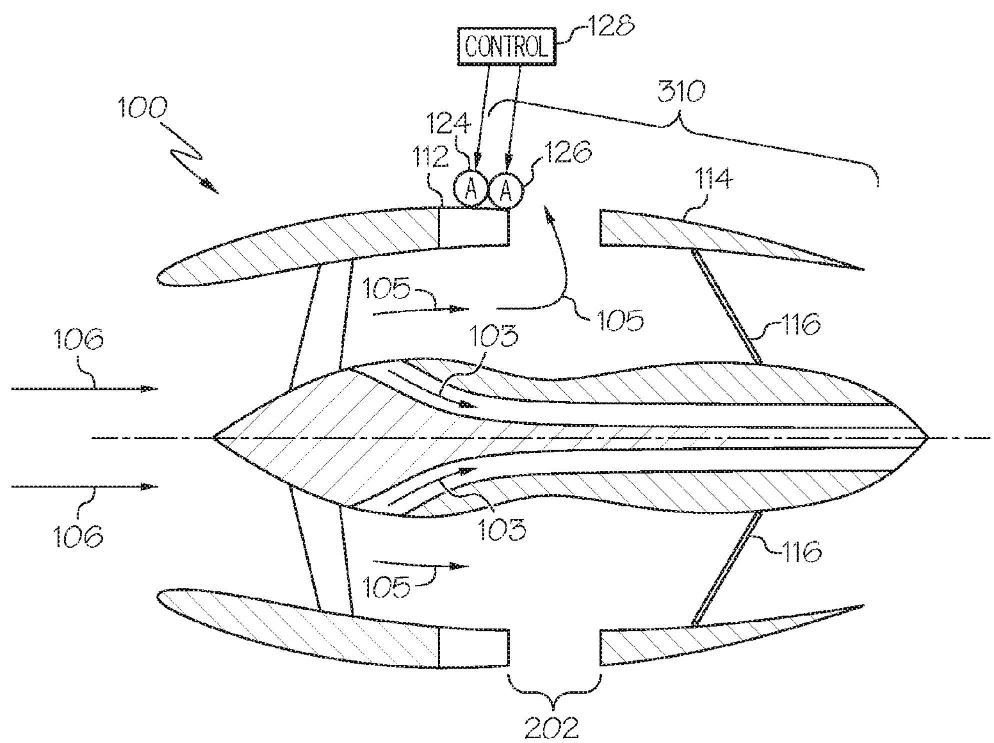

A turbofan engine is a component of an aircraft's propulsion system that typically generates thrust by means of an accelerating mass of gas. Simplified cross section views of a traditional aircraft turbofan engine 100 are depicted in FIGS. 1-4. In particular, FIGS. 1 and 2 depict the engine 100 equipped with a mixed flow thrust reverser system, and with the thrust reverser system in a stowed position and deployed position, respectively, and FIGS. 3 and 4 depict the engine 100 equipped with a fan flow thrust reverser system, and with the thrust reverser system in a stowed position and deployed position, respectively.

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112, an annular translatable cowl, or transcowl 114, and one or more doors 116 (two in the depicted embodiment). The transcowl 114 is mounted on the support structure 112 and has an inner surface 118 and an outer surface 122. The transcowl 114 is axially translatable, relative to the support structure 112, between a stowed position, which is the position depicted in FIG. 1, and a deployed position, which is the position depicted in FIG. 2. In the stowed position, the transcowl 114 is disposed adjacent the support structure 112. In the deployed position, the transcowl 114 is displaced from the support structure 112 by a second distance to form a reverse thrust aperture 202 (see FIG. 2).

Each of the one or more doors 116 is rotatable between a first position, which is the position depicted in FIG. 1, and a second position, which is the position depicted in FIG. 2. More specifically, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In particular, at least a portion of the engine exhaust flow 107 (e.g., mixed core flow 103 and fan flow 105) is redirected through the reverse thrust aperture 202.

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112, the transcowl 114, and the one or more doors 116 (again, two in the depicted embodiment). Moreover, each door 116 is rotatable between a first position, which is the position depicted in FIG. 3, and a second position, which is the position depicted in FIG. 4. Similarly, each door 116 is rotatable between the first position and the second position, when the transcowl 114 translates between the stowed position and the deployed position, respectively. As is generally known, each door 116 is configured, when it is in the second position, to redirect at least a portion of the engine airflow through the reverse thrust aperture 202 to thereby generate reverse thrust. In this case, however, only fan bypass flow 105 is redirected through the reverse thrust aperture 202.

As FIGS. 1-4 also depict, the thrust reverser systems 110, 310 additionally include a plurality of actuators. In particular, the thrust reverser systems 110, 310 include at least one or more main actuators 124 (only one depicted) and one or more assist actuators 126 (only one depicted). The main actuators 124 are coupled to the support structure 112 and the transcowl 114, and are configured to supply an actuation force to the transcowl 114. It will be appreciated that the main actuators 124 may be implemented using any one of numerous types of electric, hydraulic, or pneumatic actuators. Regardless of the type of actuators that are used, each is responsive to commands supplied from a 128 to supply an actuation force to the transcowl 114, to thereby move the transcowl 114 between the stowed position and the deployed position.

Each assist actuator 126 is coupled between a main actuator 124 (or the support structure 112) and a door 116, and are configured to supply an actuation assist force to the doors 116. It will be appreciated that the assist actuators 126 may be implemented using any one of numerous types of electric, hydraulic, or pneumatic actuators. Regardless of the type of actuators 126 that are used, each is responsive to commands supplied from the control 128 to supply an actuation assistance force to its associated door 116. As a result, and as will be described in more detail further below, each assist actuator 126 shares some of the load with its associated main actuator 124.

As will also be described momentarily, each assist actuator 126 may also function as a lock, and each is movable between a locked position and an unlocked position. In the locked position, transcowl translation from the stowed position into the deployed position is prevented, and in the unlocked position, transcowl translation from the stowed position into the deployed position is allowed.

Figure 5:
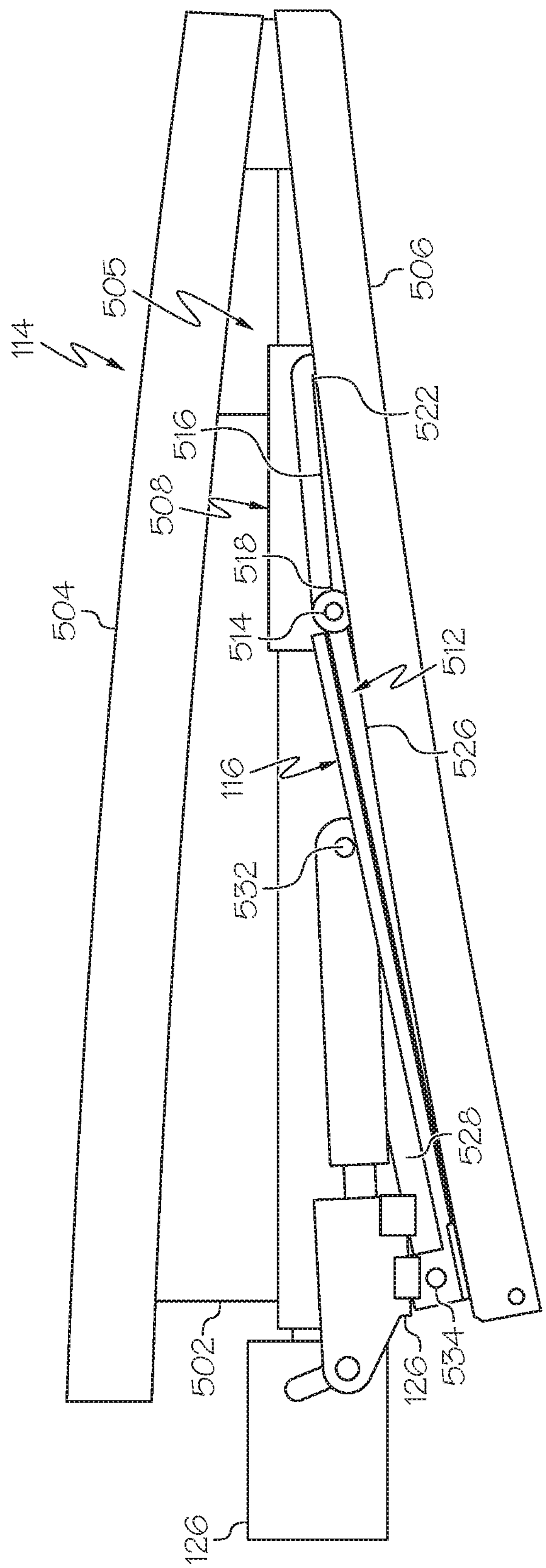
FIGS. 5 and 6 depict simplified cross section views of a portion of a turbofan engine equipped with a fan flow thrust reverser system in a stowed and deployed position.
Figure 6:
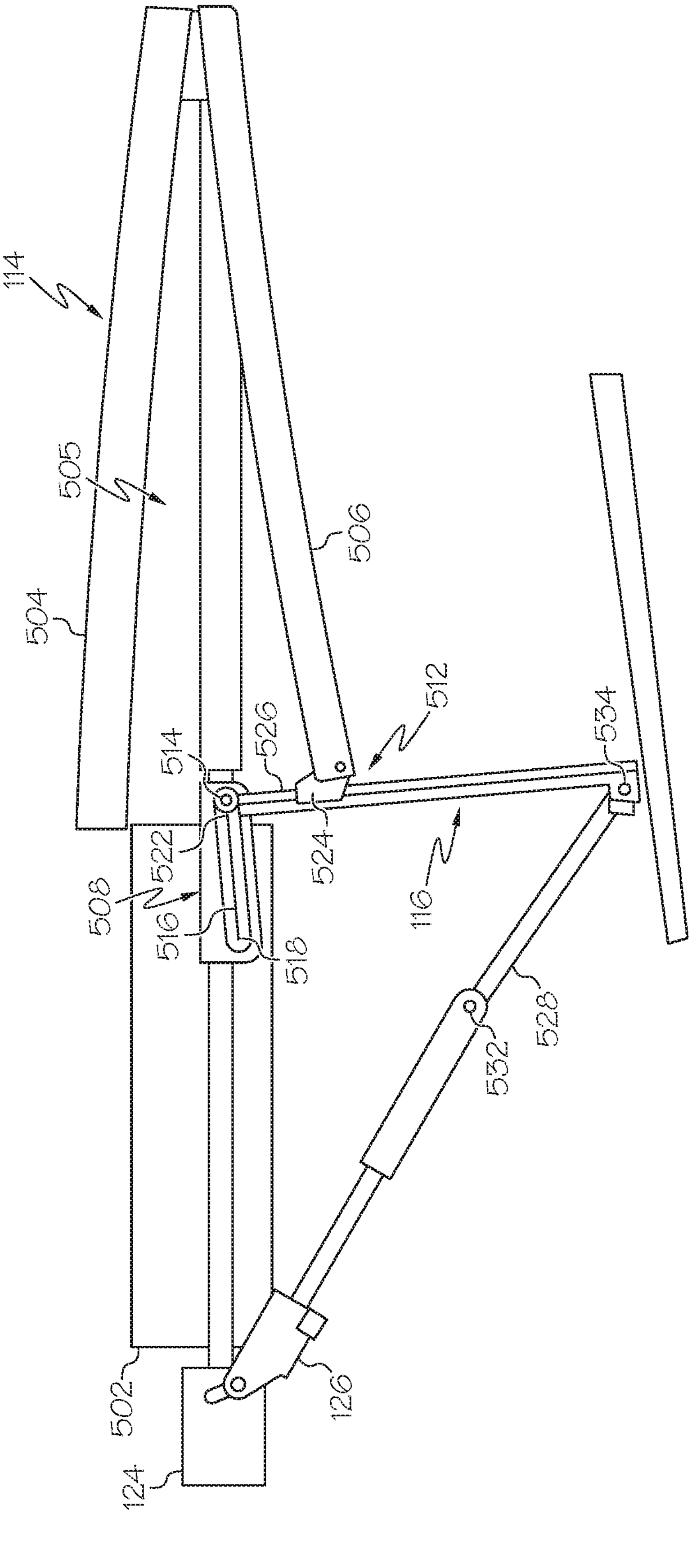

Referring now to FIGS. 5 and 6, a simplified cross section views of a portion of a turbofan engine 100 equipped with a fan flow thrust reverser system 310 is depicted. Thus, in addition to depicting the support structure 112, one of the transcowls 114, one of the doors 116, one of the main actuators 124, and one of the assist actuators 126, these figures also depict a cascade 502, which includes a plurality of cascade vanes. Before proceeding further with the description of the depicted fan flow thrust reverser system 310, it should be noted that the depicted system is merely one example of the mechanical configuration and intercoupling between the support structure 112, transcowls 114, doors 116, main actuators 124, and assist actuators 126, and that the system could be implemented using any one of numerous and varied configurations.

Returning now to the description, it is generally known that the cascade 502 is a fixed structure that does not move during the operation of the thrust reverser system 310. It should be noted that the depicted transcowl 114 includes an outer structure 504 and an inner structure 506. As depicted in FIG. 5, transcowl 113 is in the stowed position, and thus the door 116 is in the first position, the door 116 is disposed radially inward of the cascade 502, and both the cascade 502 and door 116 are generally enveloped by the transcowl 114. More particularly, the cascade 502 and door 116 are disposed within a cavity 505 that is defined between the outer structure 504 and an inner structure 506.

The depicted system 310 includes a guide track assembly 508, and a pivot assembly 512. The guide track assembly 508 is coupled to, and provides a guided connection between, the door 116 and the cascade 502 and provides a guided connection. In the depicted embodiment, this guided connection is implemented via one or more rollers 514, which are coupled to the door 116 and implement the door pivot point. The rollers 514 are disposed within a slot 516, which has a first end 518 and a second end 522. As such, the door pivot point is able to translate within the slot 516, which allows the door 116 to translate in the fore and aft directions relative to the cascade 502. It will be appreciated that this particular configuration, which provides lost-motion functionality, is just one of numerous configurations, which could be implemented with or without lost-motion functionality.

The pivot assembly 512 includes a sleeve 524 that is rotationally coupled to the inner structure 506 of the transcowl 114 and is slidably mounted on a roller shaft 526 (or other suitable device) formed as part of, or otherwise coupled to, the door 116, and is disposed along the length of the door 116. As such, the door 116 is also able to move in the fore and aft directions relative to the transcowl 114.

As FIGS. 5 and 6 also depict, a link arm 528 is coupled between the door 116 and the assist actuator 126. More specifically, the link arm 528, which includes a first end 532 and a second end 534, is rotationally coupled to the door 116 at its first end 532, and is rotationally coupled to the assist actuator 126 at its second end 534. Preferably, the link arm second end 534 is coupled to the door 116 at a point resulting in the greatest effective lever length from the door pivot point. Thus, in the depicted embodiment, the link arm second end 534 is coupled to or near an end of the door 116.

It was noted above that each assist actuator 126 may also function as a lock. This feature is depicted in FIG. 5, which shows that when the thrust reverser system 100 is in the retracted (stowed) position, the assist actuators 126 and link arms 528 fold up into the cavity 505 that is defined between the outer structure 504 and an inner structure 506. Because of the close proximity to the main actuator 124 and the cowl structure in the stow position, the assist actuator 126 may also function as a lock.

With the configuration described above, and depicted in FIGS. 5 and 6, as the transcowl 114 is translated toward the deploy position, the rollers 514 travel within their respective slots 516, and the sleeves 524 slidably travel along their respective roller shafts 526. Each 514 is initially located at the first end 518 of its slot 516, and travels toward the second end 522 of its slot 516 during deployment. In the depicted embodiment, the length of each slot 516 is less than the travel of the transcowl 114 and less than the length of its door 116. The travel of each roller 514 in its respective slot 516 is preferably initiated first during transcowl 114 translation. During this initial translation phase, the door 116 translates with the transcowl 114, but the door 116 preferably does not rotate (or rotate to any significant degree) about its rollers 514 relative to the cascade 502. In addition, travel of the sleeves 524 along their respective roller shafts 526 preferably does not occur until the rollers 514 have traveled the full lengths of their respective slots 516.

After the doors begin rotating, and upon reaching a predetermined intermediate position (not depicted) between the first and second positions, the link arms 528 on the assist actuators 126 rotate around to be inline with the associated actuators 126. The control 128 then commands the assist actuators 126 to move. When the assist actuator 126 and associated link arms 528 are inline, the assist actuator 126 commences load sharing. The load share between the main and assist actuators 124, 126 could be scheduled throughout the thrust reverser system operation based on control current ratio. When the control 128 detects that braking power during deploy exceeds a certain threshold, then additional power may be commanded the assist actuators 126. In this manner, main actuator power never exceeds this threshold. This threshold could be set to a power level normally encountered during stow. This serves to minimize main actuator weight.

Figure 7:
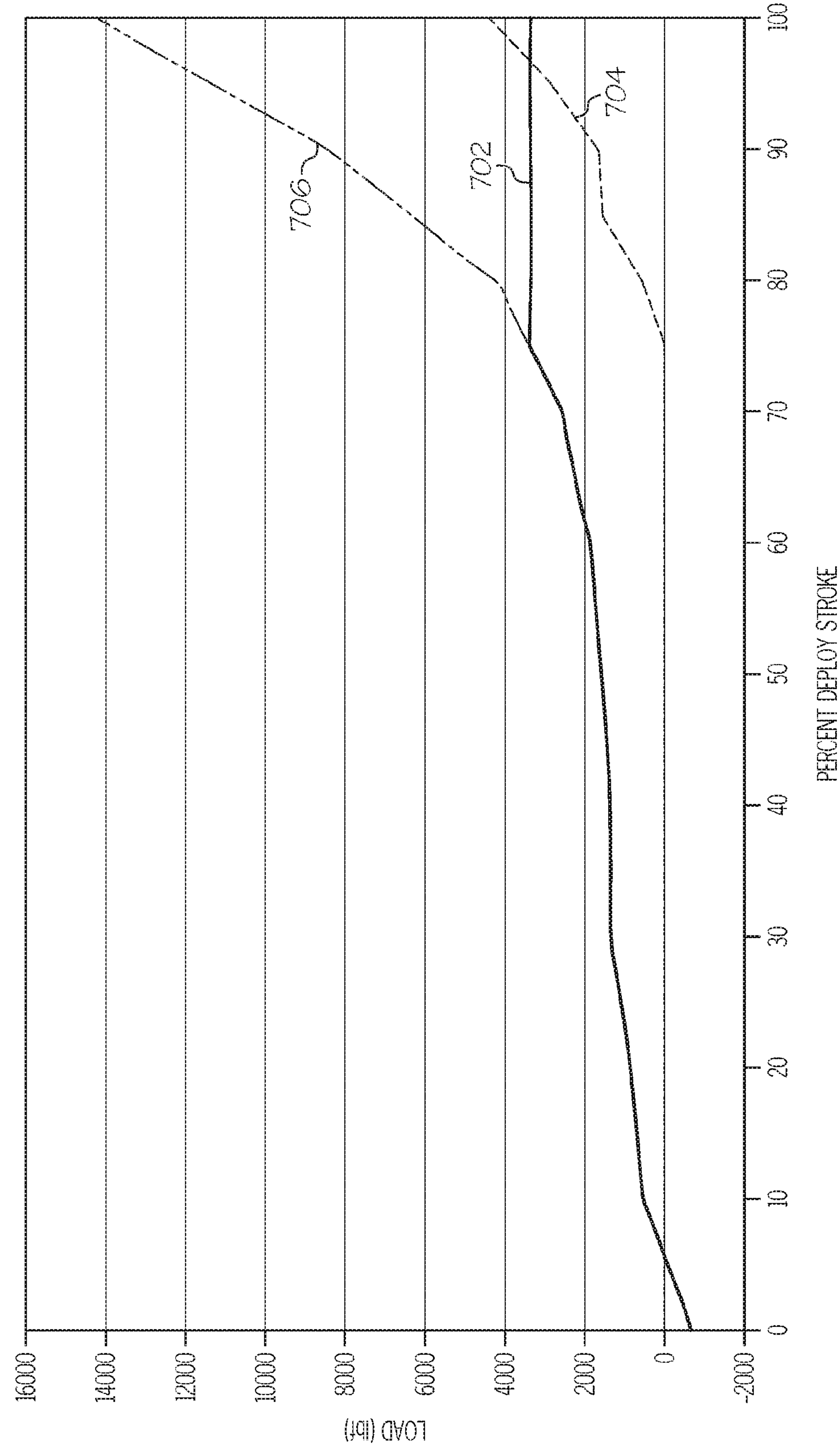
FIG. 7 depicts one embodiment of a load sharing schedule between main actuators and assist actuators of the systems depicted in FIGS. 5 and 6.

One embodiment of a schedule of load sharing between the main actuators 124 and the assist actuators 126 is depicted in FIG. 7. It should be noted that curve 702 represents main actuator load, curve 704 represents assist actuator load, and curve 706 represents main actuator load in a convention system without the assist actuators 126. As graphically depicted therein, the assist actuators 126 (and associated link arms 528) are configured to begin sharing the load with the main actuator 124 when the thrust reverser system 110, 310 is at about the 75% deploy position. Thereafter, the assist actuators 126 are further commanded to move, and take on more of the load from the main actuators 124. As curve 706 depicts, the assist actuators significantly decrease the main actuator load in a convention system.

It should be noted that the control 128 may be configured, at least in the depicted embodiment, to energize the assist actuators 126 throughout the entire deploy and stow operations of the thrust reverser system 110, 310. During the deploy operation, for example, the assist actuators 126 may initially be energized to move to the unlocked position (when configured as a lock), and then energized, simultaneously with the main actuators 124, so as to not generate any dynamic braking loads. Then, when the thrust reverser system 110, 310 is at the predetermined intermediate position, the control 128, as described above, further commands the assist actuators 126 to move, and take on more of the load from the main actuators 124. It will be appreciated that the control 128 may implement any one of numerous control techniques, such as position control, load control, or the like. It will additionally be appreciated that in some embodiments, the assist actuators 126 may only be energized during a portion of the deploy and/or stow operations.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust reverser system for a gas turbine engine, comprising:

a support structure configured to be mounted to the turbine engine;

a transcowl mounted on the support structure and axially translatable, relative to the support structure, between a stowed position and a deployed position;

a door pivotally coupled to the support structure and rotatable between at least a first position and a second position when the transcowl translates between the stowed position and the deployed position, respectively, the door configured, when it is in the second position, to redirect engine airflow to thereby generate reverse thrust;

a main actuator configured to supply an actuation force to the transcowl to thereby move the transcowl between the stowed and deployed positions; and an assist actuator coupled to the door, the assist actuator configured to supply an actuation assist force to the door and, upon rotation of the door to an intermediate position between the first position and the second position, to commence load sharing with the main actuator.

2. The thrust reverser system of claim 1, further comprising:

a cascade coupled to the support structure and including a plurality of cascade vanes.

3. The thrust reverser system of claim 2, wherein:

the transcowl includes an outer structure, an inner structure, and a cavity defined between the outer and inner structures; and when the transcowl is in the stowed position and the door is in the first position:

the door is disposed radially inwardly of the cascade, and the door and cascade are disposed within the cavity.

4. The thrust reverser system of claim 3, further comprising:

a guide track assembly having a slot formed therein, the slot having a first end and a second end; and a roller disposed within the slot and coupled to the door to implement a door pivot point, the roller, and thus the door pivot point, translatable within the slot.

5. The thrust reverser system of claim 4, further comprising a roller shaft coupled to, and disposed along a length of, the door; and a sleeve rotationally coupled to the transcowl and slidably mounted on the roller shaft.

6. The thrust reverser system of claim 3, further comprising:

a link arm having a first end and a second end, the first end rotationally coupled to the door, the second end rotationally coupled to the assist actuator.

7. The thrust reverser system of claim 6, wherein the first end of the link arm is rotationally coupled at least adjacent to an end of the door.

8. The thrust reverser system of claim 7, wherein, when the transcowl is in the stowed position:

the link arm and the assist actuator fold up into the cavity; and the assist actuator is configured as a lock.

9. The thrust reverser system of claim 1, further comprising:

a control coupled to the main actuator and the assist actuator and configured to (i) energize the main actuator throughout transcowl movement between the stowed and deployed positions and (ii) energize the assist actuator to controllably load share with the main actuator at least when the door is rotated to the intermediate position.

10. A thrust reverser system for a gas turbine engine, comprising:

a support structure configured to be mounted to the turbine engine;

a transcowl mounted on the support structure and axially translatable, relative to the support structure, between a stowed position and a deployed position;

a door pivotally coupled to the support structure and rotatable between at least a first position and a second position when the transcowl translates between the stowed position, and the deployed position, respectively, the door configured, when it is in the second position, to redirect engine airflow to thereby generate reverse thrust;

a main actuator configured, upon being electrically energized, to supply an actuation force to the transcowl to thereby move the transcowl between the stowed and deployed positions;

an assist actuator coupled to the door and configured, upon being electrically energized, to supply an actuation assist force to the door, to thereby reduce loading on the main actuator; and a control coupled to the main actuator and the assist actuator, the control configured to:

(i) energize the main actuator throughout transcowl movement between the stowed and deployed positions, and (ii) energize the assist actuator at least when the door is rotated to a predetermined intermediate position between the first position and the second position, wherein the energizing the assist actuator commences load sharing with the main actuator when the door is at the intermediate position.

11. The thrust reverser system of claim 10, further comprising:

a cascade coupled to the support structure and including a plurality of cascade vanes.

12. The thrust reverser system of claim 11, wherein:
the transcowl includes an outer structure, an inner structure, and a cavity defined between the outer and inner structures; and
when the transcowl is in the stowed position and the door is in the first position:
the door is disposed radially inwardly of the cascade, and
the door and cascade are disposed within the cavity.

13. The thrust reverser system of claim 12, further comprising:
a guide track assembly having a slot formed therein, the slot having a first end and a second end; and
a roller disposed within the slot and coupled to the door to implement a door pivot point, the roller, and thus the door pivot point, translatable within the slot.

14. The thrust reverser system of claim 13, further comprising
a roller shaft coupled to, and disposed along a length of, the door; and
a sleeve rotationally coupled to the transcowl and slidably mounted on the roller shaft.

15. The thrust reverser system of claim 12, further comprising:
a link arm having a first end and a second end, the first end rotationally coupled to the door, the second end rotationally coupled to the assist actuator.

16. The thrust reverser system of claim 15, wherein, when the transcowl is in the stowed position:
the link arm and the assist actuator fold up into the cavity; and
the assist actuator is configured as a lock.

17. A thrust reverser system for a gas turbine engine, comprising:
a support structure configured to be mounted to the turbine engine;
a plurality of transcowls mounted on the support structure, each transcowl axially translatable, relative to the support structure, between a stowed position and a deployed position;
a plurality of doors pivotally coupled to the support structure, each door rotatable between at least a first position and a second position when the transcowls translate between the stowed position and the deployed position, respectively, each door configured, when it is in the second position, to redirect engine airflow to thereby generate reverse thrust;
a plurality of main actuators, each main actuator configured to supply an actuation force to one of the transcowls to thereby move the transcowls between the stowed and deployed positions; and
a plurality of assist actuators, each assist actuator coupled to one of the doors, each assist actuator configured to supply an actuation assist force to one of the doors and, upon rotation of the doors to an intermediate position between the first position and the second position, to commence load sharing with the main actuators.

18. The thrust reverser system of claim 17, wherein:
each transcowl includes an outer structure, an inner structure, and a cavity defined between the outer and inner structures;
the thrust reverser system further comprises a cascade coupled to the support structure and including a plurality of cascade vanes;
when the transcowls are in the stowed position and the doors are in the first position:
each door is disposed radially inwardly of the cascade, and
each door and the cascade are disposed within one of the cavities.

19. The thrust reverser system of claim 18, further comprising:
a guide track assembly having a slot formed therein, the slot having a first end and a second end;
a roller disposed within the slot and coupled to one of the doors to implement a door pivot point, the roller, and thus the door pivot point, translatable within the slot;
a roller shaft coupled to, and disposed along a length of, the one of the doors; and
a sleeve rotationally coupled to the transcowl and slidably mounted on the roller shaft.

20. The thrust reverser system of claim 18, further comprising:
a link arm having a first end and a second end, the first end rotationally coupled to one of the doors, the second end rotationally coupled to one of the assist actuators,
wherein, when the transcowls are in the stowed position, the link arm and the one of the assist actuators fold up into the one of the cavities, and the assist actuators are configured as a lock.

* * * * *